Patented Sept. 20, 1932

UNITED STATES PATENT OFFICE

1,877,947

HEINRICH NERESHEIMER, OF LUDWIGSHAFEN-ON-THE-RHINE, ERNST HONOLD, OF FRANKFORT-ON-THE-MAIN-FECHENHEIM, AND GEORG BÖHNER, OF FRIEDRICHSFELD, GERMANY, ASSIGNORS TO GENERAL ANILINE WORKS, INC., OF NEW YORK, N. Y., A CORPORATION OF DELAWARE

PROCESS FOR PRODUCING VAT DYESTUFFS OF THE ANTHRAQUINONE ACRIDINE SERIES

No Drawing. Application filed June 9, 1930, Serial No. 460,089, and in Germany August 30, 1929.

In the copending application filed on the same date by Heinrich Neresheimer and Ernst Honold new vat dyestuffs are described corresponding to the probable general formula:

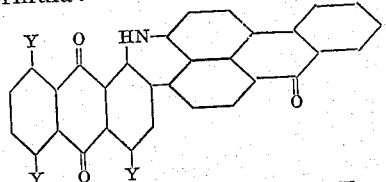

wherein one Y means the group NH-acyl and the other Y's mean hydrogen and the benzanthronyl residue may contain halogen atoms, and obtained by the action of an acylating agent on the reaction products of an alkaline acting agent on bz-1-benzanthronyl-1-amino-4- or -5- or -8-aminoanthraquinone compounds.

Now we have found that so far as the acyl-group belongs to the aromatic series the same and analogues dyestuffs are obtained when starting from bz-1-benzanthronyl-1-amino-aroylamino-anthraquinone compounds, containing already the aroylamino-group in their molecule and corresponding probably to the general formula:

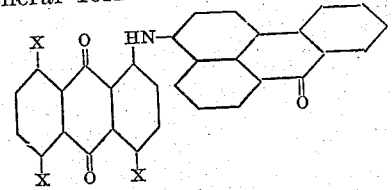

wherein one X means the group

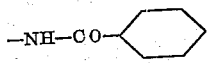

and the other X's mean hydrogen, and subjecting these products to the action of such alkaline condensing agents, which are practically free from hydroxyl-groups, such as sodiumaniline. Surprisingly the dyestuffs corresponding to the aforesaid general formula are obtained thereby in a smooth reaction whereas, when treating the same initial compounds with the usual alkaline condensing agents containing free hydroxyl-groups according to U. S. Patent No. 995,936, not only a condensation, but also a saponification of the aroylamino-group takes place.

In order to further illustrate our invention, the following examples are given, the parts being by weight and all temperatures in centigrade degrees; but we wish it to be understood that our invention is not limited to the examples given, nor to the exact conditions stated therein:—

Example 1

A solution of 90 parts of sodiumaniline in 310 parts of anhydrous aniline is heated to about 140° and at this temperature, while allowing nitrogen to pass through, 20 parts of bz-1-benzanthronyl-1-amino-5-benzoylamino-anthraquinone are added, obtained by condensing bz-1-brombenzanthrone with 1-amino-5-benzoylamino-anthraquinone. The mass is kept at this temperature until no unchanged starting material is present. When cool, the mass is poured on an excess of dilute hydrochloric acid and the separated dyestuff is filtered off and washed out with water. When dry, it represents a dark powder, soluble in concentrated sulfuric acid with a green color and dyeing cotton from a bluish violet vat fast yellowish olive shades. The dyestuff is practically identical with the dyestuff of Example 1 of the copending application filed by Heinrich Neresheimer and Ernst Honold.

When using bz-1-benzanthronyl-1-amino-4- or -8-benzoylamino-anthraquinone as starting material, condensation products of very similar character are obtained.

Example 2

100 parts of anhydrous aniline, 11.5 parts of sodium metal and a quantity of anhydrous alcohol sufficient for forming the alcoholate, are heated in an apparatus provided with a reflux condenser, while allowing nitrogen to pass through, until all of sodium metal is converted into the alcoholate. Then 5 parts of bz-1-benzanthronyl-1-amino-5-benzoylamino-anthraquinone are added and the mixture is kept at about 170°, until no unchanged initial product can be detected. When cool, the reaction mass is worked up as described in Example 1. The vat dyestuff thus obtained is identical with that of Example 1.

We claim:

1. A process for producing vat dyestuffs of the anthraquinone series which comprises subjecting bz-1-benzanthronyl-1-amino-benzoylamino-anthraquinone compounds corresponding probably to the general formula:

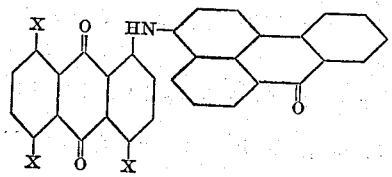

wherein one X means the group

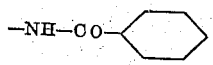

and the other X's mean hydrogen, to the action of an alkaline condensing agent, which is practically free from hydroxyl-groups selected from the group consisting of alkali metal salts of aromatic amines and of alcoholates.

2. A process for producing a vat dyestuff of the anthraquinone series which comprises subjecting bz-1-benzanthronyl-1-amino-5-benzoylamino-anthraquinone to the action of an alkaline condensing agent, which is practically free from hydroxyl-groups selected from the group consisting of alkali metal salts of aromatic amines and of alcoholates.

In testimony whereof, we affix our signatures.

HEINRICH NERESHEIMER.
ERNST HONOLD.
GEORG BÖHNER.